C. E. POST AND P. G. WAGNER.
NONGLARE HEADLIGHT.
APPLICATION FILED NOV. 16, 1917.
Reissued Sept. 5, 1922. 15,449.
2 SHEETS—SHEET 1.
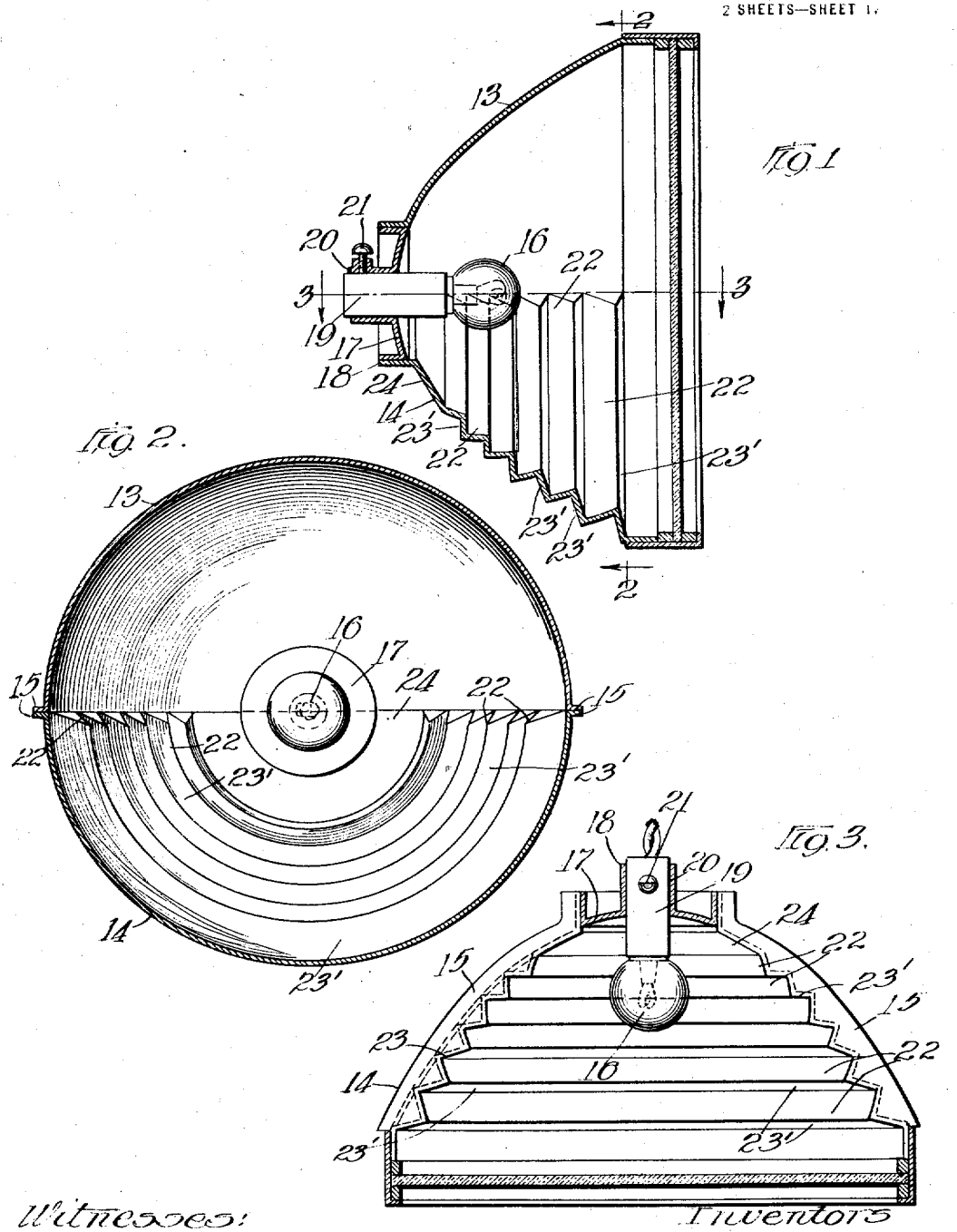
Witnesses:
Harry R. White.
W. P. Kirby
Inventors
Charles E. Post and
Paul G. Wagner.
By Rudolph Mc Loz Attis.

C. E. POST AND P. G. WAGNER.

NONGLARE HEADLIGHT.

APPLICATION FILED NOV. 16, 1917.

Reissued Sept. 5, 1922.

15,449.

2 SHEETS—SHEET 2.

Witnesses:
Harry R. White
W. F. Kilroy

Inventor:
Charles E. Post and
Paul G. Wagner.
By Rudolph Ern. Lotz
Atty.

Reissued Sept. 5, 1922. Re. 15,449

UNITED STATES PATENT OFFICE.

CHARLES E. POST AND PAUL G. WAGNER, OF CHICAGO, ILLINOIS, ASSIGNORS TO FRANK E. NELLIS, JR., OF CHICAGO, ILLINOIS.

NONGLARE HEADLIGHT.

Original No. 1,189,621, dated July 4, 1916, Serial No. 87,047, filed March 27, 1916. Application for reissue filed November 16, 1917. Serial No. 202,437.

*To all whom it may concern:*

Be it known that we, CHARLES E. POST and PAUL G. WAGNER, citizens of the United States, and residents of Chicago, in the county of Cook, State of Illinois, have invented certain new and useful Improvements in Nonglare Headlights; and we do hereby declare that the following is a full, clear, and exact description thereof, reference being had to the accompanying drawings, and to the characters of reference marked thereon, which form a part of this specification.

Our invention relates to a non-glare headlight.

The ordinary headlight of motor driven vehicles is objectionable because of its blinding glare to approaching pedestrians and vehicles, and the danger resulting therefrom.

Many municipalities have passed ordinances requiring that the lights of motor driven vehicles shall be so directed that the center rays thereof shall strike the ground within a distance of 75 feet from the front thereof, or the light shall be so dimmed as to eliminate all glare therefrom. The immediate result of such municipal ordinances was the invention of so-called dimmers adapted to be applied to the headlight and whose purpose it was to eliminate the objectionable glare. The many defects of practically all dimmers now in use is two-fold: First, they are inoperative except when applied to certain makes of headlights; secondly they are inefficient because they reduce the light thrown out by the headlight.

There are some headlights in use at the present time which emit the objectionable glare even after the application of every kind of dimmer. It is for this reason that the above municipal ordinances are, as a rule, not strictly enforced. The true source of the difficulty seems not to have been realized by the inventors devising dimmers of various kinds. If they were feasible to construct a headlight having a parabolic reflector mathematically true, on a commercial scale, the question would be easily solved. However, it is impossible to so construct the parabolic reflector at a price at which the headlights must necessarily be sold. The reflecting surfaces of the headlights are not truly parabolic, and consequently rays of light reflected from either the lower or the upper half thereof will be thrown in all directions, causing the objectionable glare.

It is an object of this invention to construct the reflector of the headlight in such a manner that all the rays of light thrown upon the road will come from the upper half thereof and be projected in a forward and slightly downward direction, striking the ground at approximately 75 feet in front of the vehicle. The reflector is so constructed that practically all the rays falling upon the lower half thereof are reflected upon the same path in which they came from the source of light thence to the upper half of the reflector and thence downwardly and outwardly. We have found by careful tests that the efficient illumination of our non-glare headlight at 75 feet from the lamp is 88-6/10 per cent, while the nearest result of headlights equipped with the best dimmers known to us shows a maximum efficiency of only 55-4/10 per cent.

It is an object of our invention to construct a headlight in which the locus of light is adapted to be located slightly in advance of the focus of the parabolic portion of the reflector surface and on the axis of the latter; and in which substantially one-half of the whole reflector consists of a smooth polished metal surface while the remainder thereof consists of a series of successive semi-frustums of concentric hollow spheres, the concave faces of which have radii meeting substantially at the point in the axis of the parabolic portion of the reflector at which the locus of light is adapted to be located.

With the above and other objects in view which will appear as the description proceeds, our invention consists in the construction, arrangement and combination of parts hereinafter described and claimed.

In the accompanying drawings which form a part of this specification, we have illustrated a convenient and practical embodiment of our invention, and in which:

Figure 1 is a vertical central section of our non-glare headlight.

Figure 2 is a vertical section taken on line 2—2 of Figure 1.

Figure 3 is a central horizontal section taken on line 3—3 of Figure 1.

Figure 4:
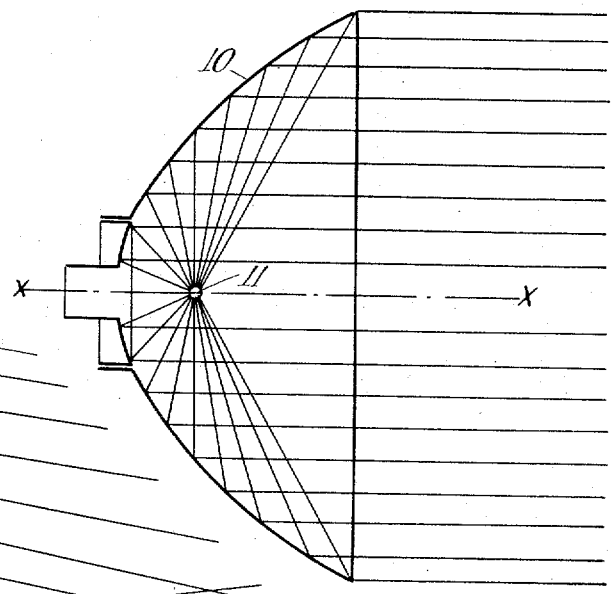
Figures 4, 5 and 6 are central vertical sections through the headlight showing the method of constructing the same.
Figure 5:
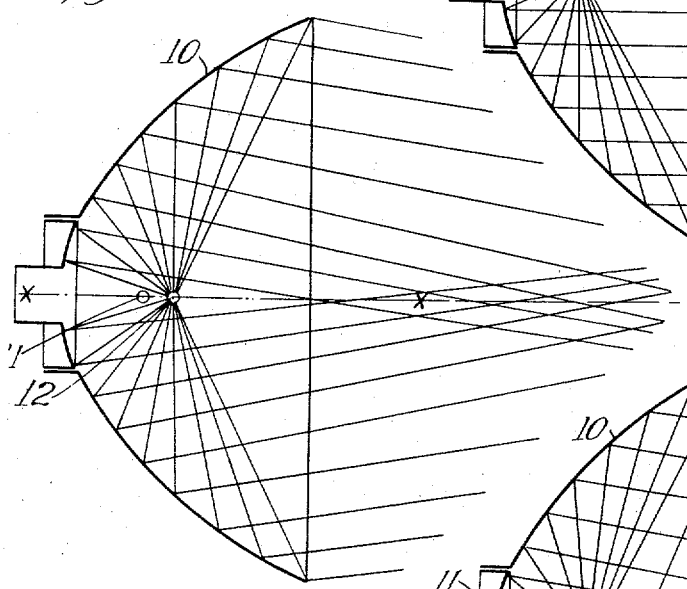

Referring to Fig. 4 of the drawings, 10 indicates a parabola with 11 the focus thereof. A parabolic reflector, if the parabolic curve is mathematically correct would reflect the rays of light coming from the focus along lines parallel to the axis $x$. Since it is impossible to produce a true parabolic reflector on a commercial scale, the ordinary parabolic reflector has a good deal of objectionable glare due to reflected rays coming from the uneven surface thereof. For this reason, we advance the locus of the light to a point indicated at 12 in Fig. 5. This point is located on the axis and slightly in advance of the true focus 11. The rays of light coming from the point 12 will be reflected as indicated in Fig. 5 and converge as shown. The rays reflected from the upper half of the parabola strike the ground in front of the vehicle, but the rays reflected from the lower half, unless changed in their direction would be projected in an upward and forward direction, causing the objectionable glare. We therefore, construct the lower half of the reflector with means whereby the light falling thereon will be so reflected that the path of reflection coincides with the path of incidence, and the reflected light will strike the upper half of the reflector, whence it will be reflected downwardly and forwardly in the same direction as the direct rays of light coming from the locus of light. It has been proposed hitherto to provide a small convex reflector adjacent to and below the locus of light, the purpose of such a reflector being to reflect the light falling upon it to the upper half. However, in view of the fact that the source of light is necessarily of appreciable size, and furthermore that the concave reflector, because of its small size would magnify any errors of its construction, the light reflected to the upper half did not coincide with the light coming directly from the locus of light and consequently a percentage of the reflected rays of light were reflected from the upper half of the reflector in a forward and upward direction, causing the objectionable eye glare. In our construction, the objectionable glare is eliminated and the light falling upon the lower half of the reflector is utilized for the useful road light.

Figure 6:
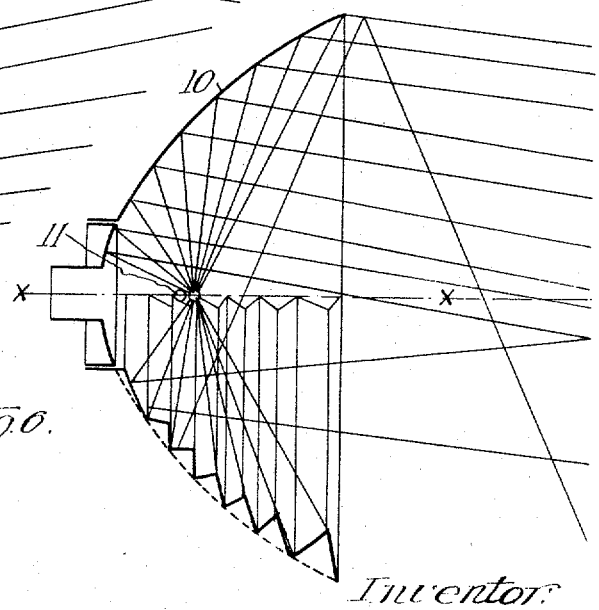

Taking the locus of light, which as stated above is slightly in advance of the focus of the parabola, we construct from this point as a center, a series of concentric spheres as indicated in Fig. 6, and we select and employ a number of semi-frustums of concentric hollow spheres which are disposed so that the planes of the side edges of each thereof extend perpendicularly to the axis of the parabolic reflector surface, said frustums being preferably relatively so disposed that one side edge of each lies in the parabolic plane of the smooth reflector surface, thus presenting to the point in the axis of the latter at which the locus of light is adapted to be disposed, a continuous reflector surface. From this construction, it will be understood that the rays of light coming from the locus will be reflected on their paths of incidence to said locus and passing beyond to the upper half of the parabolic reflector will be projected in the same way as the rays coming direct from the said locus.

Referring now to Figs. 1, 2 and 3, the headlight comprises an upper and a lower half, the upper half 13 being of ordinary polished metal. The lower half 14, whose general contour is parabolic, is composed of reflector faces or plates, hereinafter to be described. The two halves 13 and 14 of the reflector are fastened together by means of coacting flanges 15, 15. The source of light 16 which may be the ordinary electric incandescent lamp, is adjustably mounted in a lamp carrier plate 17, said plate being circular and detachably mounted in an aperture 18 provided in the apex of the reflector. The carrier rod 19 of the lamp 16 is slidably mounted in a neck 20 of the lamp carrier plate. A set screw 21 on said neck clamps the rod 19 in adjusted position. The outer face of the carrier plate 17 is preferably frosted. The deflector plates 22 are portions of the concentric spheres, whose center is the locus of the light 16. The radii of these plates converge to meet substantially at a point in the axis of the parabolic portion of the reflector at which the locus of light is adapted to be located, the planes of the side edges of said plates extending perpendicularly to said axis. They are arranged in stepped relation and the contiguous side edges of adjacent plates are joined by arcuate walls 23′. These walls are substantially in radial planes, which pass through the locus of the light, the object being to prevent any light coming directly from the lamp falling thereon. In practice, the lower half of the reflector is stamped out of one piece of metal by means of a die. Using a die for stamping out the reflector plates necessitates that the connecting wall 23′ which connects the first pair of deflector plates nearest the apex of the reflector, is not in a plane radial to the locus of the light. A marginal portion 24 in the lower half of the reflector between the lamp-supporting plate 17 and the first pair of reflector plates is provided, which is slightly inclined from the true parabola. Any light falling on the margin 14 and the wall 23′ from the lamp will be reflected upwardly and outwardly, issuing from the extreme upper half of the headlight. Such rays of light will not be objectionable, as they will not strike an approaching vehicle or pedestrian.

From the foregoing description, the operation of our non-glare headlight will be easily understood. The electric lamp 16 is placed in the locus which forms the center of the spheres on which the reflector plates 22 are taken. When in its adjusted position, the same is clamped in place by means of the set screw 21. The light falling from the reflector plates will be reflected on their paths of incidence to the upper half of the reflector, whence they will be reflected in conjunction with the rays of light coming directly from the light in a forward and downward direction, producing the so-called road light.

It will be readily understood from the foregoing specification that one of the main objects of the invention is to provide a headlight in which that portion of the reflector surface which causes the objectionable glare is utilized to reflect the rays normally projected therefrom upon that portion of the reflector surface which projects the rays upon the road so that no appreciable loss in efficiency and waste of light rays from the source will result and at the same time the area of the reflector surface and its radial distance from and accuracy of contour and location with respect to the locus of the light is such as to insure the maximum of accuracy of direction of the reflected rays through their paths of incidence upon the parabolic reflector surface to the end that such reflected rays may be projected from the parabolic reflector surface as nearly as possible parallel with those passing directly from the locus of light to said parabolic reflector surface. It will be understood, of course, that the light from an incandescent electric lamp does not emanate from a point but from a considerable area, and that the location of the source of light is seldom if ever so accurately positioned with respect to the lamp base as to permit the locus of the light to be at all times accurately adjusted with respect to the axis and focus of the parabolic reflector surface and the spherical reflector surface to insure the attainment of the desired result inasmuch as it is obviously impossible to effect reflection of all rays from the latter through their paths of incidence and through the locus of light. Errors of adjustment of the lamp may throw the locus of light forward or rearward of the intended point and this would in turn result in a variation in the direction reflection of rays from the spherical to the parabolic reflector surfaces without, however, materially impairing the efficiency of illumination.

It will also be apparent from the foregoing specification that our construction provides maximum efficiency of illumination without occasioning any waste of metal inasmuch as the two halves of the lamp housing of respectively widely different construction are maintained of approximately equal size and contour and are readily fitted and secured together to provide a complete housing having no "freak" characteristics.

While we have shown the preferred embodiment of our invention, it will be understood that we do not desire to confine ourselves to the specific details of construction, arrangement and combination of parts as shown, as various changes may be made by those skilled in the art without departing from the spirit of our invention as claimed.

We claim:

1. In a non-glare headlight, the combination of a parabolic reflector having its upper half smooth and its lower half containing a plurality of concave reflector plates, said plates being portions of concentric spheres whose center is a point on the axis of the parabola slightly in advance of the focus thereof, and a light located at said point.

2. In a non-glare headlight, the combination of a parabolic reflector having its upper half smooth, and its lower half comprising a plurality of concave reflector plates extending transversely to the axis of the parabola, said plates being portions of concentric spheres whose center is a point on the axis of the parabola slightly in advance of the focus thereof and a light located at said point.

3. In a non-glare headlight, the combination of a parabolic reflector, the upper half thereof being smooth, the lower half comprising a plurality of concave reflector plates extending transversely to the axis of the parabola, said plates being segments of concentric spheres whose center is a point on the axis of the parabola slightly in advance of the focus thereof, a removable lamp-carrying member in the apex of the reflector, a lamp adjustably carried by said member and adapted to be located at said point, and means for locking said lamp in adjusted position.

4. In a non-glare headlight, the combination of a parabolic reflector, the upper half thereof being smooth, the lower half comprising a plurality of concave reflector plates extending transversely to the axis of parabola, said plates being segments of concentric spheres, whose center is a point on the axis of the parabola slightly in advance of the focus thereof, each pair of adjacent reflector plates being joined by a wall lying substantially in a plane passing through said center, a removable lamp-carrying plate at the apex of said reflector, said removable plate having its outer face frosted, a lamp adjustably carried by said removable plate and adapted to be located at said point and means for locking said lamp in adjusted position.

5. A headlight comprising a flared housing presenting a circular mouth disposed in a plane perpendicular to the axis of the housing, the inner surface of the latter constituting two opposed reflector surfaces, a source of light within the housing disposed relatively to one of said reflector surfaces to cause rays of light impinging thereon to be projected in a general direction converging toward the axis of the housing, the other of said reflector surfaces disposed to reflect rays of light impinging thereupon upon the opposed reflector surface in a general direction to cause the same to be projected from the mouth of the housing in the same general direction as the first-named direct rays from said source of light.

6. In a non-glare headlight, a lamp housing having a circular light projecting opening at one end, said housing comprising a parabolic reflector constituting substantially one-half of its inner surface and a spherical reflector surface constituting the other half thereof, the last-named surface comprising a plurality of concentric bands of spherical contour and varying diameters, means for positioning a source of light in said housing having its locus disposed substantially in the axis and forward of the focus of said parabola and substantially at the common center of said reflector bands, whereby light rays from the source will be reflected to project from said bands substantially through the locus of light upon the parabola.

7. A non-glare headlight comprising a reflector consisting in part of a parabolic reflector and in part of an opposed stepped reflector surface comprising a plurality of concentric bands of varying diameter, a source of light positioned with respect to the parabolic portion of said reflector to effect projection of rays by reflection in a given general direction, and positioned with respect to the opposed reflector surface to effect reflection of rays from the latter upon the parabolic reflector surface in a general direction to cause the same to be re-reflected and projected from the latter in the same general direction as are the direct rays from the source of light.

8. A headlight comprising a tapered housing consisting of two parts joined together in a plane of its axis, one of said parts constituting a parabolic reflector and the other thereof a stepped reflector surface presenting its portions of greatest radius in the parabolic plane of the other reflector, means for disposing a source of light within said housing in a predetermined position relatively to both parts thereof, alternate surfaces of said stepped reflector presenting a substantially continuous surface substantially concentric with the point at which said source of light is adapted to be located whereby to cause the rays of light passing from said source to said stepped reflector surface to be reflected upon the parabolic reflector substantially coincidentally with the direct rays from said source upon the latter thereby causing all rays so directed and reflected upon said parabolic reflector to be projected substantially in the same direction from the mouth of the housing.

9. In combination with a headlight comprising a reflector structure of general parabolic form, a source of light axially located within said structure and a reflector element secured within the structure so formed and arranged that the incident rays from the source of light which would normally strike the lower portion of the reflector structure will be reflected onto the upper portion thereof to be in turn reflected forwardly and downwardly.

10. A headlight of the character described comprising a reflector structure of general parabolic form, and a source of light axially located within said structure, said structure being so formed that the incident rays from the source of light striking its lower portion will be reflected onto its upper portion to be in turn reflected forwardly and downwardly.

11. A headlight of the character described comprising a source of light, a reflector structure located about said light, and a series of corrugations in the lower portion of said structure of such shape that the rays of light emanating from the source of light strike the forwardly projecting legs of said corrugations which are at such angle as to redirect the rays to the upper portion of the reflector structure.

CHARLES E. POST.
PAUL G. WAGNER.